US012354276B2

United States Patent
Ono et al.

(10) Patent No.: US 12,354,276 B2
(45) Date of Patent: Jul. 8, 2025

(54) INFORMATION PROCESSING DEVICE, MOUNTING DEVICE, AND INFORMATION PROCESSING METHOD

(71) Applicant: FUJI CORPORATION, Chiryu (JP)

(72) Inventors: Keiichi Ono, Anjo (JP); Shuichiro Kito, Toyota (JP)

(73) Assignee: FUJI CORPORATION, Chiryu (JP)

( * ) Notice: Subject to any disclaimer, the term of this patent is extended or adjusted under 35 U.S.C. 154(b) by 505 days.

(21) Appl. No.: 17/762,546

(22) PCT Filed: Sep. 25, 2019

(86) PCT No.: PCT/JP2019/037450
§ 371 (c)(1),
(2) Date: Mar. 22, 2022

(87) PCT Pub. No.: WO2021/059374
PCT Pub. Date: Apr. 1, 2021

(65) Prior Publication Data
US 2023/0237667 A1     Jul. 27, 2023

(51) Int. Cl.
*G06T 7/13*     (2017.01)
*G06V 10/25*     (2022.01)
*G06V 10/60*     (2022.01)

(52) U.S. Cl.
CPC ............... *G06T 7/13* (2017.01); *G06V 10/25* (2022.01); *G06V 10/60* (2022.01); *G06T 2207/30164* (2013.01)

(58) Field of Classification Search
CPC ............ G06T 7/13; G06T 2207/30164; G06T 2207/10004; G06T 2207/20076; G06V 10/25; G06V 10/60
See application file for complete search history.

(56) References Cited

U.S. PATENT DOCUMENTS 5,136,661 A  *  8/1992   Kobayasi ................. G06T 7/73
                                                                 382/209
5,805,722 A  *  9/1998   Cullen ..................... G06T 7/73
                                                                 382/168

(Continued)

FOREIGN PATENT DOCUMENTS

CN       107610171 A  *  1/2018
EP        3480726 A1  *  5/2019  ............. G06F 18/25

(Continued)

OTHER PUBLICATIONS

M. González-Hidalgo, S. Massanet, A. Mir and D. Ruiz-Aguilera, "Edge image aggregation method using ordered weighted averaging functions," 2016 IEEE International Conference on Fuzzy Systems (FUZZ-IEEE), Vancouver, BC, Canada, 2016, pp. 1355-1362, doi: 10.1109/FUZZ-IEEE.2016.7737847 (Year: 2016).*

(Continued)

*Primary Examiner* — Michael Robert Cammarata
(74) *Attorney, Agent, or Firm* — Oblon, McClelland, Maier & Neustadt, L.L.P.

(57) ABSTRACT

An information processing device is a device used in a mounting device that collects a component and arranges the component on a substrate. In this information processing device, a control section acquires a captured image including a component, sets multiple detection lines for detecting a brightness difference of the component with respect to the acquired captured image in the component, and obtains a reference position of an outer edge portion from the multiple detection lines. Next, the control section uses a predetermined weight coefficient of which weight tends to decrease as a distance from the reference position increases to obtain a candidate value obtained by adding the weight coefficient to one or more outer edge portion candidates existing on the detection line. Subsequently, the control section selects a (Continued)

position of the outer edge portion existing on the detection line based on the obtained candidate value.

7 Claims, 8 Drawing Sheets

(56) References Cited

U.S. PATENT DOCUMENTS

| | | | | |
|---|---|---|---|---|
| 5,974,169 | A * | 10/1999 | Bachelder | G06T 7/12 |
| | | | | 382/199 |
| 2006/0291726 | A1* | 12/2006 | Takeshima | G06V 10/754 |
| | | | | 382/209 |
| 2010/0027906 | A1* | 2/2010 | Hara | G06T 7/13 |
| | | | | 382/266 |
| 2010/0034484 | A1 | 2/2010 | Kido | |
| 2015/0055840 | A1* | 2/2015 | Xiao | G06F 18/24 |
| | | | | 382/131 |
| 2017/0236258 | A1* | 8/2017 | Hsu | G06T 7/13 |
| | | | | 382/260 |
| 2018/0376633 | A1* | 12/2018 | Nagaishi | H05K 13/0813 |
| 2020/0250809 | A1* | 8/2020 | Kito | H05K 13/0813 |
| 2024/0078801 | A1* | 3/2024 | Wang | G06F 18/40 |

FOREIGN PATENT DOCUMENTS

| | | | | |
|---|---|---|---|---|
| JP | 9-128547 | A | | 5/1997 |
| JP | 11-66326 | A | | 3/1999 |
| JP | 2007212187 | A | * | 8/2007 |
| JP | 2009-128959 | A | | 6/2009 |
| JP | 2010-67247 | A | | 3/2010 |
| JP | 2010118030 | A | * | 5/2010 |
| WO | WO-2017109881 | A1 | * | 6/2017 ......... H05K 13/0015 |
| WO | WO 2018/179187 | A1 | | 10/2018 |

OTHER PUBLICATIONS

International Search Report mailed on Dec. 10, 2019 in PCT/JP2019/037450 filed on Sep. 25, 2019 (1 page).

Anonymous: "HALCON Solution Guide III-A 1D Measuring", Jan. 1, 2017 (Jan. 1, 2017), pp. 1-64, XP055924998, Retrieved from the Internet: URL:https://web.archive.org/web/20180205042206if_/http://www.mytec.com:80/fileadmin/Redaktion/mytec.com/documentation/solution_guide/solution_guide_iii_a_1d_measuring.pdf , [retrieved on Aug. 25, 2022].

* cited by examiner

INFORMATION PROCESSING DEVICE, MOUNTING DEVICE, AND INFORMATION PROCESSING METHOD

TECHNICAL FIELD

The present specification relates to an information processing device, a mounting device, and an information processing method.

BACKGROUND ART

Conventionally, as an information processing device, for example, there has been proposed a device which acquires an initial position corresponding to a registered image included in a search target image, arranges a correspondence point search line of a pattern model so that the correspondence point search line overlaps on a search target image according to an initial position, obtains a correspondence point on the search target image corresponding to each base point for each correspondence point search line using an edge strength and an edge angle at a position along the correspondence point search line on the search target image, and performs precise positioning with higher accuracy than accuracy of the given initial position so that a cumulative value of evaluation values of each base point and the correspondence point of the base point is the minimum or the maximum (for example, refer to Patent Literature 1).

PATENT LITERATURE

Patent Literature 1: JP-A-2010-67247

BRIEF SUMMARY

Technical Problem

However, the device described in Patent Literature 1 does not consider a case where, for example, multiple edge candidates that are positions of outer edge portions of a component are detected, and in this case, accurate edge detection may not be performed. That is, in the information processing device, it has been demanded to more reliably detect a position of an outer edge portion of a member.

The present disclosure is made in consideration of the problems, and a main object of the present disclosure is to provide an information processing device, a mounting device, and an information processing method capable of more reliably detecting a position of an outer edge portion with respect to a component.

Solution to Problem

An information processing device, a mounting device, and an information processing method disclosed in the present specification adopt the following means in order to achieve the main object described above.

According to an aspect of the present specification, there is provided an information processing device used in a mounting device configured to collect a component and arrange the component on a substrate, the information processing device including: a control section configured to acquire a captured image including the component, set multiple detection lines for detecting a brightness difference of the component with respect to the acquired captured image in the component, obtain a reference position of outer edge portions from the multiple detection lines, use a predetermined weight coefficient of which weight tends to decrease as a distance from the reference position increases to obtain a candidate value obtained by adding the weight coefficient to one or more outer edge portion candidates existing on the detection lines, and select a position of the outer edge portion existing on the detection line based on the obtained candidate value.

In this information processing device, the multiple detection lines for detecting the brightness difference of the component with respect to the captured image including the component are set in the component, the reference position of the outer edge portion is obtained from the multiple detection lines, and the predetermined weight coefficient of which the weight tends to decrease as the distance from the reference position increases is used to obtain a candidate value obtained by adding the weight coefficient to one or more outer edge portion candidates existing on the detection line. Then, the position of the outer edge portion existing on the detection line is selected based on the obtained candidate value. In this information processing device, even in a case where the candidates of the multiple component outer edge portions exist, the position of the outer edge portion of the detection line is selected by adding the weight coefficient based on the reference position obtained from the multiple detection lines. Accordingly, even when there are some candidates detected to deviate from proper positions, it is possible to more reliably detect the position of the outer edge portion with respect to the component. Here, the expression "the weight tends to decrease as the distance from the reference position increases" is intended to allow a portion in which the weight is not reduced even when the distance from the reference position increases to partially exist, and to indicate that the weight decreases as the distance from the reference position increases as a whole. In addition, the control section may select the position of the outer edge portion of the component itself by setting the detection line across between a region of the component and an outside of the region of the component, or may select a detection line across a specific part (for example, a terminal) and another part (for example, a main body) included in the component to select the position of the outer edge portion of the specific part of the component. Similarly, the expression "the position of the outer edge portion with respect to the component" may be the outer edge portion of the entire component, or may be the outer edge portion of the specific part of the component.

DESCRIPTION OF EMBODIMENTS

Figure 1:
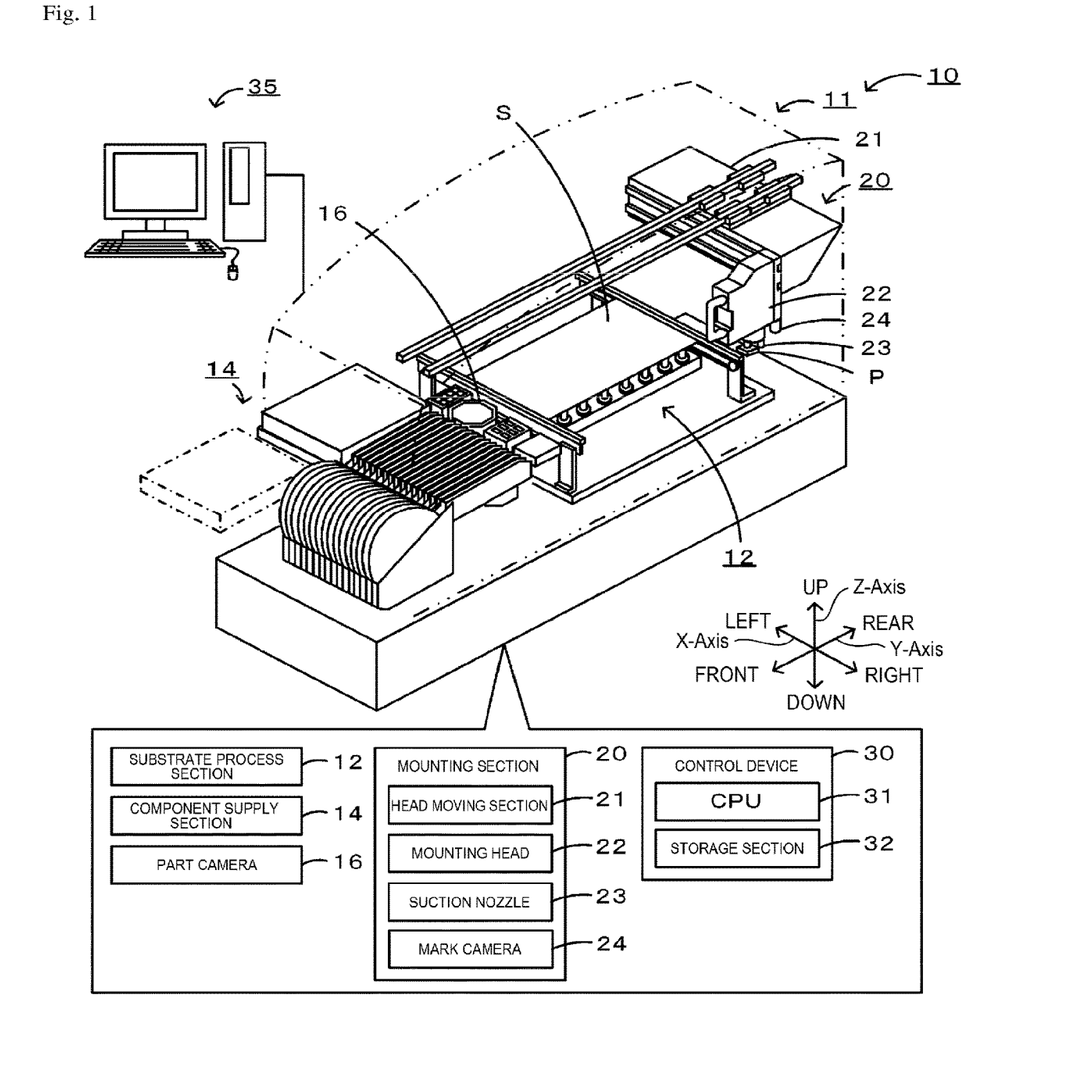
FIG. 1 is a schematic explanatory diagram illustrating an example of mounting system 10.
Figure 2:
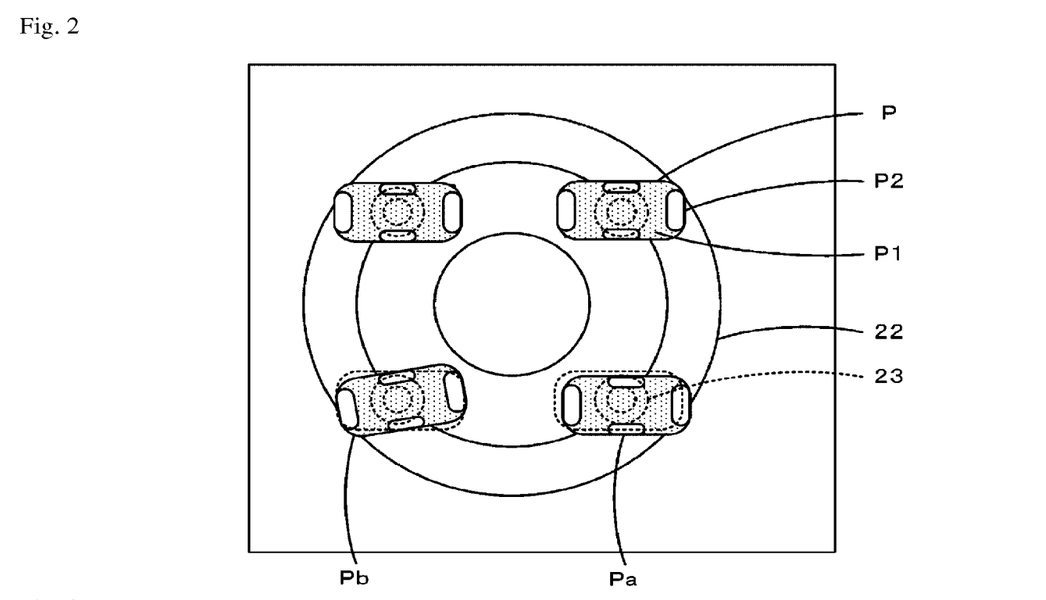
FIG. 2 is an explanatory diagram of component P collected by mounting head 22.

Hereinafter, the present embodiment will be described with reference to the drawings. FIG. 1 is a schematic explanatory diagram illustrating an example of mounting system 10 of the present disclosure. FIG. 2 is an explanatory diagram of component P collected by mounting head 22. Mounting system 10 is, for example, a system that executes mounting process involved in process of mounting component P on substrate S. Mounting system 10 includes mounting device 11 and management computer (PC) 35. Mounting system 10 is configured as a mounting line in which multiple mounting devices 11 are arranged from an upstream to a downstream. In FIG. 1, only single mounting device 11 is illustrated as a matter of convenience in description. In the present embodiment, a right-left direction (X-axis), a front-rear direction (Y-axis), and an up-down direction (Z-axis) are as illustrated in FIG. 1.

As illustrated in FIG. 1, mounting device 11 includes substrate process section 12, component supply section 14, part camera 16, mounting section 20, and control device 30. Substrate process section 12 is a unit for receiving and conveying substrate S, fixing substrate S at a mounting position, and withdrawing substrate S. Substrate process section 12 has a pair of conveyor belts that are provided to be spaced apart from each other in the front-rear direction and are stretched in the right-left direction in FIG. 1. Substrate S is conveyed by the conveyor belts.

Component supply section 14 has multiple feeders provided with reels and tray units, and is detachably attached to a front side of mounting device 11. A tape is wound around each reel, and multiple components P are held on the surface of the tape along a longitudinal direction of the tape. The tape is unwound from the reel toward the rear, and is sent by the feeder section to a collection position where the tape is picked up by suction nozzle 23 in a state where the component is exposed. Each tray unit has a tray on which multiple components are arranged and placed and moves the tray into and out of a predetermined collection position.

Part camera 16 is an imaging section for imaging an image and a unit which images one or more components P collected and held by mounting head 22. Part camera 16 is disposed between component supply section 14 and substrate process section 12. An imaging range of part camera 16 is above part camera 16. When mounting head 22 holding component P passes over part camera 16, part camera 16 images the image of component P, and outputs the captured image data to control device 30.

Mounting section 20 is a unit which collects component P from component supply section 14 and arranges component P on substrate S fixed to substrate process section 12. Mounting section 20 includes head moving section 21, mounting head 22, and suction nozzle 23. Head moving section 21 includes a slider movable in XY directions while being guided by guide rails and a motor for driving the slider. Mounting head 22 is detachably mounted on the slider and is moved in the XY directions by head moving section 21. One or more suction nozzles 23 (for example, 16, 8, 4, or the like) are detachably mounted on a lower surface side of mounting head 22, and thus, multiple components P can be collected at once. Suction nozzle 23 is a collection member that collects the component using a negative pressure. It should be noted that the collection member may be a mechanical chuck that grips component P. Mark camera 24 is disposed on a lower surface side of mounting head 22 (or the slider). Mark camera 24 is, for example, an imaging device capable of imaging substrate S, component P, or the like from the top side. Mark camera 24 moves in the XY directions in accordance with the movement of mounting head 22. Mark camera 24 has an imaging region below mark camera 24, images a reference mark used to ascertain the position of substrate S attached to substrate S, and outputs an image of the reference mark to control device 30.

Here, component P collected by mounting head 22 will be described. FIG. 2 is an explanatory diagram illustrating an example when mounting head 22 which has collected component P is viewed from below. In FIG. 2, an example in which mounting head 22 includes four nozzles 23 is illustrated. In FIG. 2, a normal position of component P is indicated by dashed lines. As illustrated in FIG. 2, for example, component P may include first region P1 including an outer edge portion (also referred to as an edge) and second region P2 having a different brightness value from first region P1. In component P, a main body is first region P1, and a terminal is second region P2. When component P is collected by mounting head 22, there may be a case where a positional deviation occurs in an XY coordinate direction with respect to the normal position (component Pa), or a case where component P rotates with respect to the normal position to cause a rotational deviation in which an inclination is generated (component Pb). Control device 30 detects such a change in the collection state of component P, corrects the deviation, and arranges component P on substrate S.

As illustrated in FIG. 1, control device 30 is configured as a microprocessor centered on CPU 31, and includes storage section 32 or the like for storing various data. Control device 30 has a function of an information processing device for detecting the position of the outer edge portion of component P. Control device 30 outputs a control signal to substrate process section 12, component supply section 14, part camera 16, and mounting section 20, and inputs a signal from mounting section 20, component supply section 14, and part camera 16. Storage section 32 stores mounting condition information including a mounting order in which component P is mounted on substrate S, an arrangement position of component P, a type of suction nozzle 23 from which component P can be collected, and the like.

Management PC 35 is a computer that manages information of each device of mounting system 10. Management PC 35 includes a control section, a storage section, a display, and an input device. Control section is configured as a microprocessor centered on a CPU. In addition to information for managing the production of mounting system 10, mounting condition information and the like are stored in the storage section.

Figure 3:
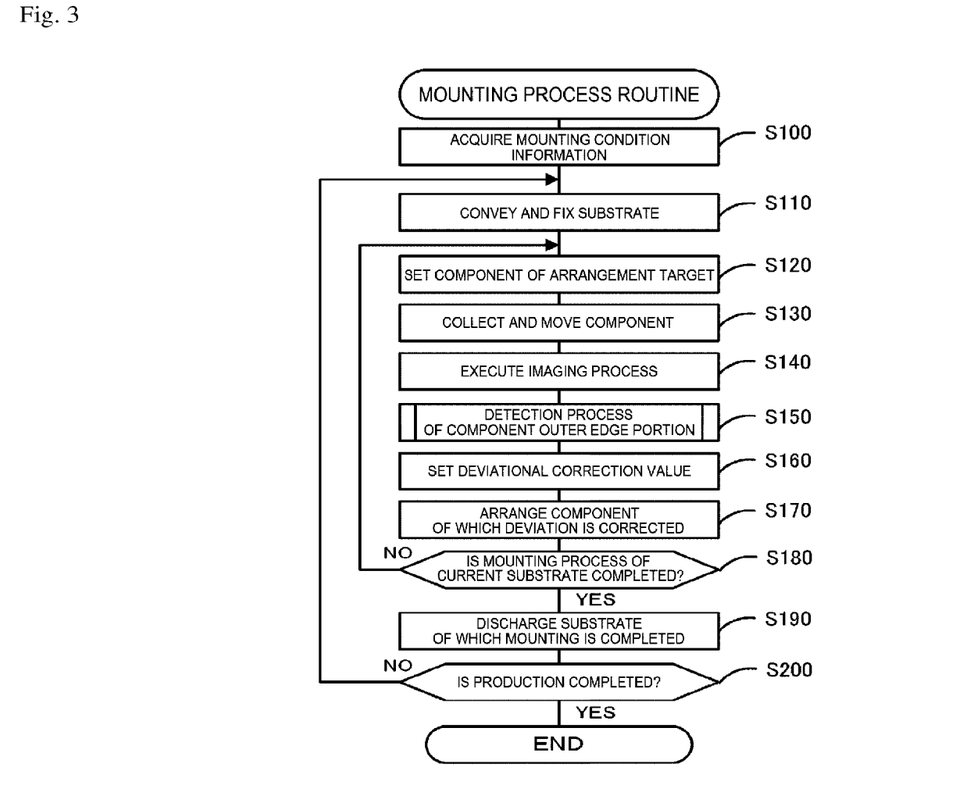
FIG. 3 is a flowchart illustrating an example of a mounting process routine.

Next, the operation of mounting system 10 according to the present embodiment configured as described above, first, the mounting process in mounting device 11 will be described. First, process by which mounting device 11 mounts component P on substrate S will be described. FIG. 3 is a flowchart illustrating an example of a mounting process routine executed by CPU 31 of mounting control section 30 of mounting device 11. This routine is stored in storage section 32 of mounting device 11 and executed in accordance with a start instruction by an operator. When this routine starts, CPU 31 reads and acquires the mounting condition information of substrate S to be produced this time (S100), causes substrate process section 12 to convey substrate S to the mounting position and to fix substrate S (S110). Next, CPU 31 sets the component which is a collection target based on the mounting condition information (S120), causes the mounting head 22 to collect component P from the feeder at a preset position, and moves component P above part camera 16 (S130).

Next, CPU 31 causes part camera 16 to image component P collected by mounting section 20 (S140), and executes component outer edge portion detection process for detecting the outer edge portion (edge) of component P (S150). Subsequently, CPU 31 sets a deviation correction value for correcting the positional deviation and/or the rotational deviation based on the position of the outer edge portion of component P detected by the component outer edge portion detection process (S160), corrects the deviation of component P using the deviation correction value, and arranges component P on substrate S (S170). Then, CPU 31 determines whether the mounting process of substrate S that is currently fixed at the mounting position is completed (S180), and executes process after S120 when the mounting process is not completed. That is, CPU 31 sets component P to be collected and arranged next, causes mounting section 20 to collect component P, corrects the deviation of component P while more accurately detecting the outer edge portion of component P, and executes the process for arranging component P on substrate S repetitively. Meanwhile, when the mounting process of substrate S that is currently fixed at the mounting position is completed in S180, CPU 31 causes substrate process section 12 to discharge substrate S of which the mounting is completed (S190), and determines whether production of all substrates S that are set in the mounting condition information is completed (S200). When the production of all substrates S is not completed, CPU 31 executes the process after S110, whereas when the production of all substrates S is completed, CPU 31 terminates this routine.

Figure 4:
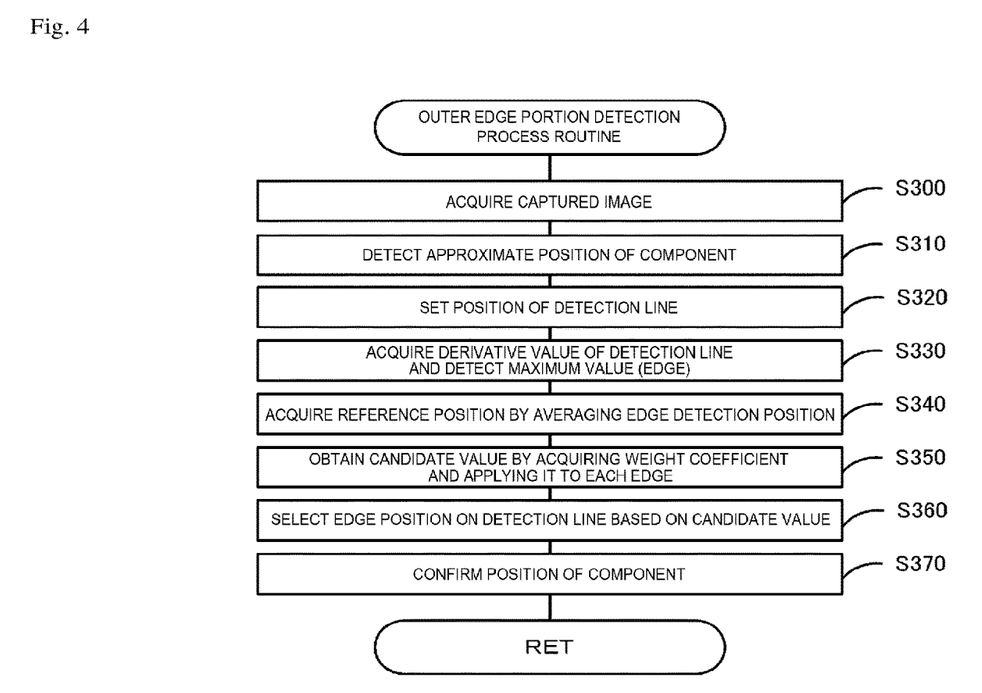
FIG. 4 is a flowchart illustrating an example of an outer edge portion detection process routine.

Next, the component outer edge portion detection process in S150 will be described. FIG. 4 is a flowchart illustrating an example of a component outer edge portion detection process routine executed by CPU 31 of control device 30. This routine is stored in storage section 32 and executed in S150 of the mounting process routine. When this routine starts, first, CPU 31 acquires the captured image imaged by part camera 16 (S300), detects an approximate position of a component included in the captured image (S310), and sets a position of a detection line (S320).

Figure 5A:
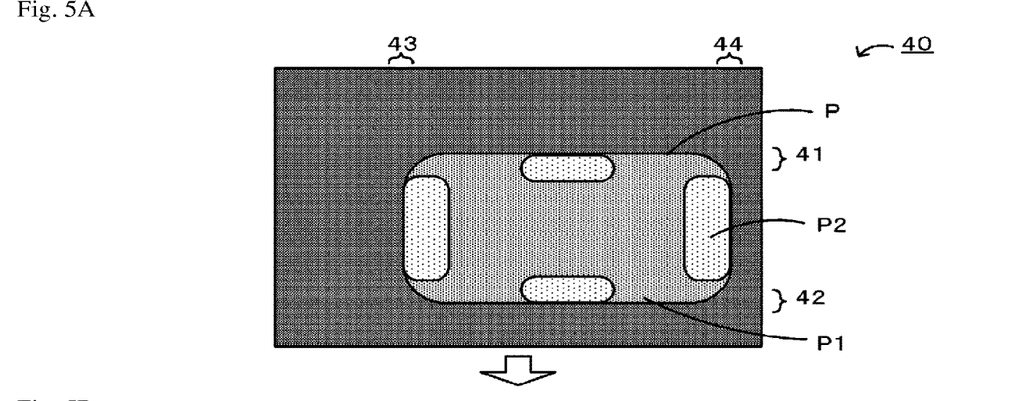
FIG. 5 is an explanatory diagram for setting detection lines 45 at outer edge portions 41 to 44 of component P.
Figure 5B:
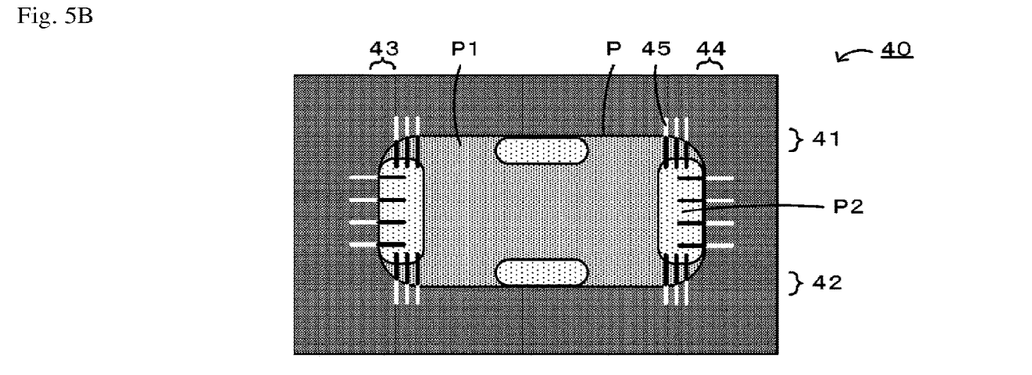

FIG. 5 is an explanatory diagram for setting detection line 45 in outer edge portions 41 to 44 of component P, FIG. 5A is an explanatory diagram of component image 40, and FIG. 5B is an explanatory diagram for setting detection line 45 in component image 40. CPU 31 detects a rough region of component P included in component image 40 based on a difference in a brightness value or the like, and sets multiple detection lines 45 for detecting a brightness difference across the region of component P and the outside of the region of component P in outer edge portions 41 to 44 of component P. In control device 30, a first side of component P is defined as outer edge portion 41, a second side is defined as outer edge portion 42, a third side is defined as outer edge portion 43, a fourth side is defined as outer edge portion 44, left three detection lines and right three detection lines are set in outer edge portions 41 and 42, and four detection lines 45 are set at a center of each of outer edge portions 43 and 44. The patterns such as lengths, the arrangement positions, and the number of detection lines 45 are determined empirically so as to more accurately detect the outer edge portion of component P, and are set in advance for each component P. Control device 30 sets the position of detection line 45 so that a predetermined detection line pattern of component P overlaps outer edge portions 41 to 44 of component P (refer to FIG. 5B). After CPU 31 sets detection line 45 in accordance with the rough position of component P, CPU 31 executes edge detection with higher accuracy.

Figure 6:
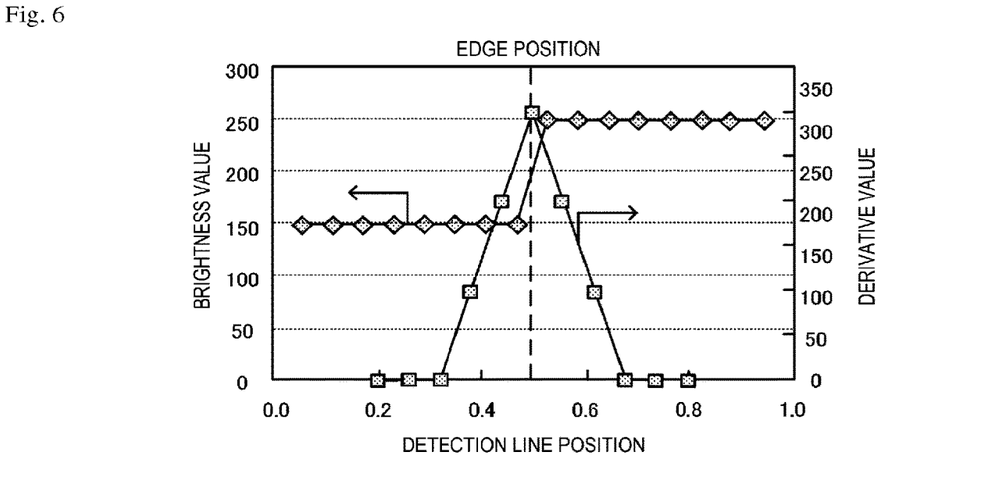
FIG. 6 is a relationship diagram between a detection line position, a brightness value, and a derivative value thereof.

After S320, CPU 31 acquires a derivative value from the brightness value on the detection line for each detection line 45, and detects the position of the maximum value (edge candidate) (S330). FIG. 6 is a relationship diagram between the detection line position, the brightness value, and the derivative value thereof. Here, description will be made using a detection line position in which a start point of detection line 45 is normalized to "0" and an end point thereof is normalized to "1". When the derivative value is obtained from the difference in the brightness values of the respective positions of the detection lines, as illustrated in FIG. 6, a peak that is the maximum value of the derivative value can be detected as the outer edge portion (edge candidate) of component P. However, as illustrated in FIG. 5, when there are first region P1 and second region P2 having different brightness and detection line 45 crosses the region outside the component, since multiple maximum peaks are detected, CPU 31 needs to detect the correct outer edge portion of component P.

Next, CPU 31 averages the detection positions of the edge candidates detected in S330 to acquire a reference position (S340). Here, CPU 31 averages the entire outer periphery of component P, and obtains the reference position with respect to the entire outer periphery. CPU 31 may use, for example, the average value as the reference position from the maximum peak position and the number of detection lines. For example, the reference position can be obtained by integrating the number of detection lines having the maximum peak position of 0.1, the number of detection lines having the maximum peak position of 0.2, or the like and dividing the integrated value by the number of detection lines. In mounting device 11, since the position of the detection line is set based on the approximate position of component P in S310, the reference position is obtained approximately at the center (0.5) of the detection line.

Figure 7:
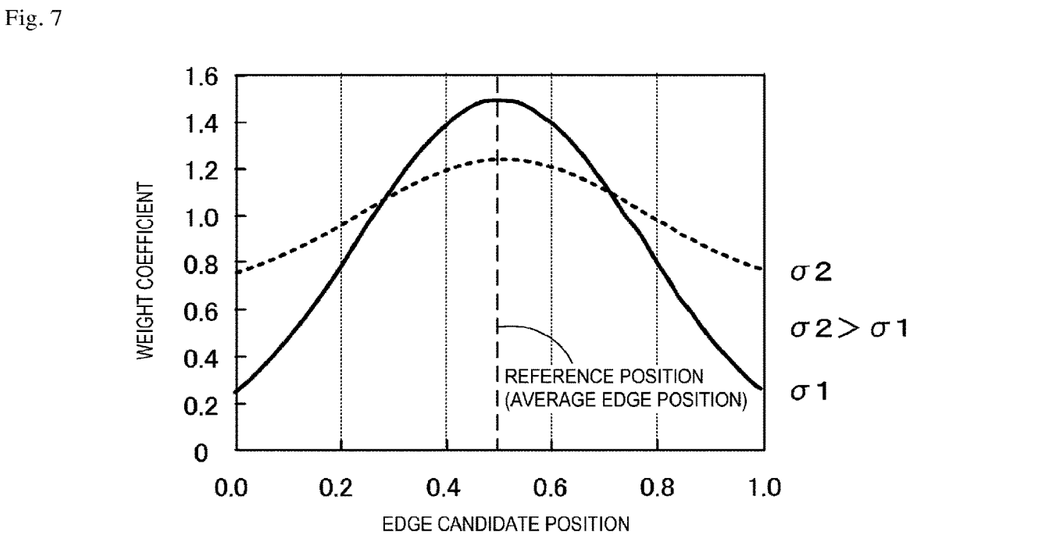
FIG. 7 is a relationship diagram between an edge candidate position and a weight coefficient.
Figure 8:
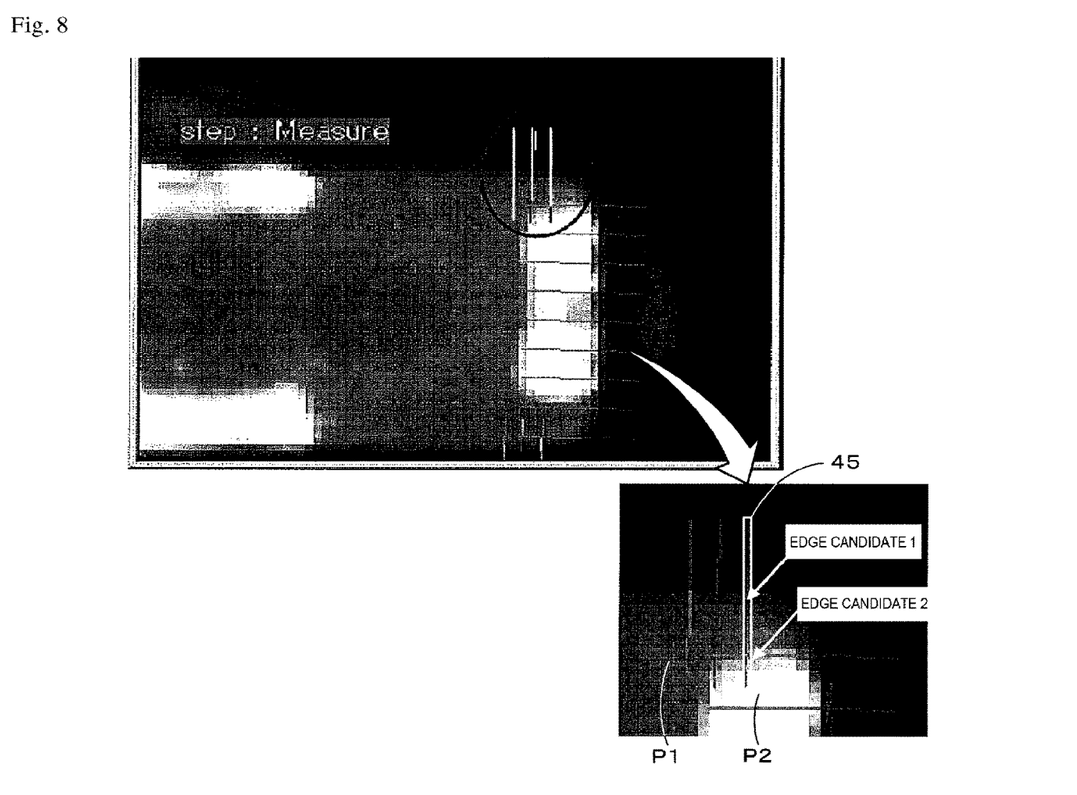
FIG. 8 is an explanatory diagram of an imaged photograph obtained by imaging component P.
Figure 9A:
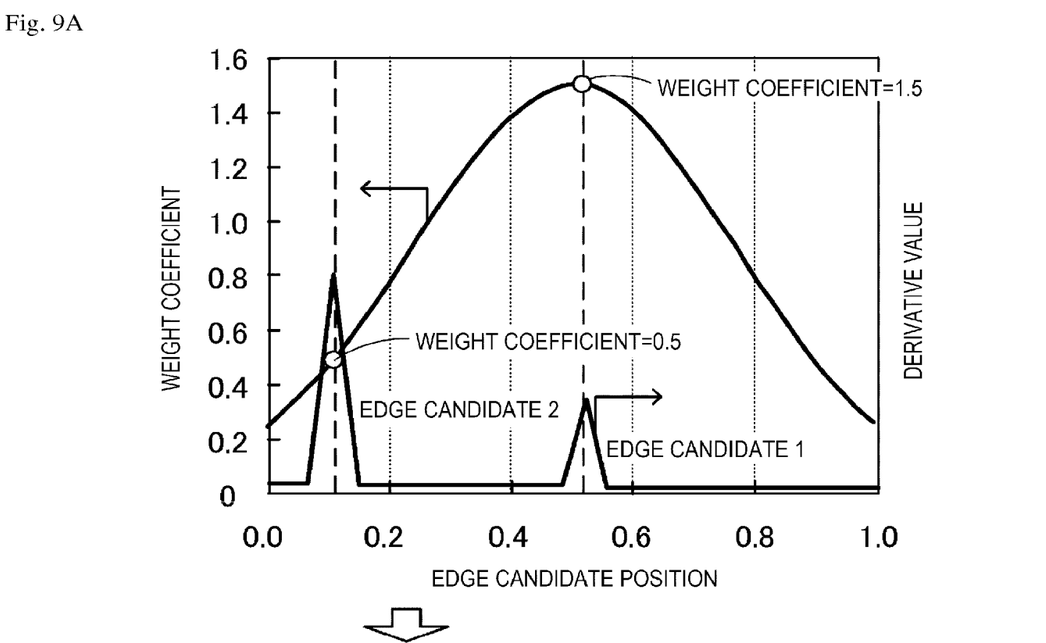
FIG. 9 is an explanatory diagram illustrating the weight coefficient added to an edge candidate.
Figure 9B:
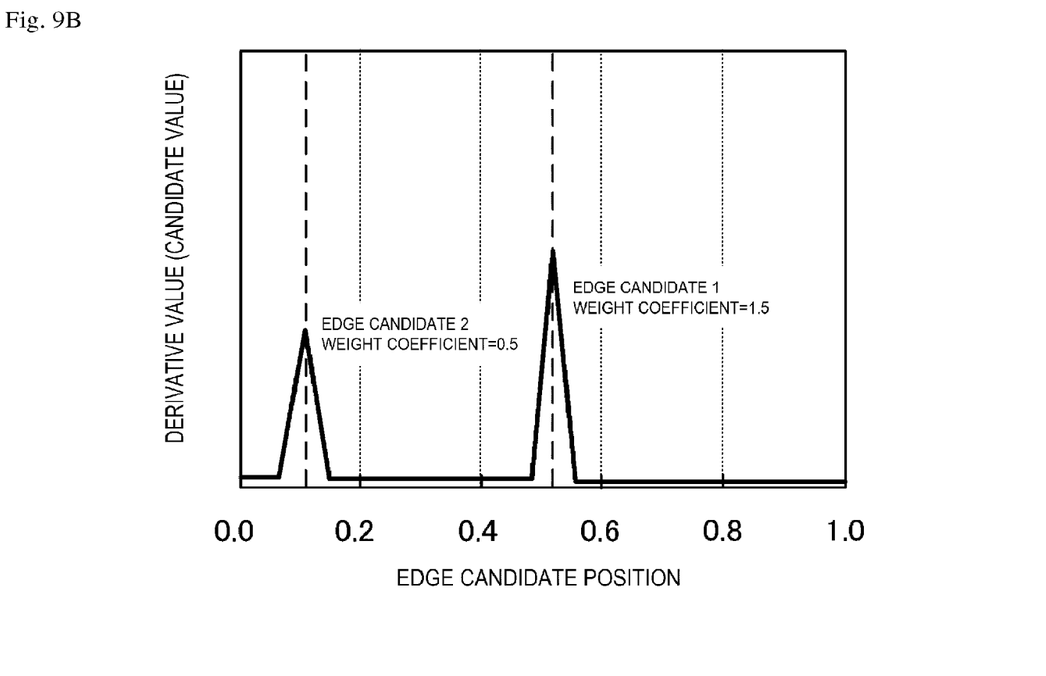

Next, CPU 31 acquires a predetermined weight coefficient, applies the weight coefficient to the edge candidates detected on each detection line, obtains a candidate value of each edge candidate (S350), and selects the position of the edge on detection line 45 based on the candidate value (S360). FIG. 7 is a relationship diagram between an edge candidate position and a weight coefficient. Weight coefficient is determined as a coefficient of a normal distribution centered on the reference position so that the weight tends to decrease as the distance from the reference position increases. For example, the weight coefficient can be obtained from a probability density function of a normal distribution (refer to Equation 1) using edge candidate position x, reference position, and weight coefficient adjusting variable a. In the weight coefficient, the reference position has the highest value, and the weight coefficient is set to have a smaller value as the distance from the reference position increases. In addition, in variable σ2 in which variable a is larger than predetermined variable 6*i*, a weight coefficient in which a change centered on the reference position is gradual is obtained, and in smaller variable σ1, a weight coefficient in which the change is larger is obtained. Then, CPU 31 selects the edge candidate position having a larger candidate value as an edge position of component P. The weight coefficient is empirically set according to the type of component P, the brightness difference between the regions, and the like. As illustrated in FIG. 7, for example, CPU 31 sets variable σ1, and applies the highest value 1.5 to the edge candidate position as the weight coefficient when there is the edge candidate position at the reference position (0.5), and applies the value 0.5 to the edge candidate position as the weight coefficient when there is the edge candidate position at 0.1 distant from the reference position.

$$f(x) = \frac{1}{\sqrt{2\pi\sigma^2}} e^{\frac{-(x-\mu)^2}{2\sigma^2}} \quad \text{Equation 1}$$

x: Edge candidate position
μ: Reference position (averaged edge position)
σ: Weight coefficient adjusting variable Here, a specific example of applying the weight coefficient will be described. FIG. 8 is an explanatory diagram of an imaged photograph acquired by imaging the image of component P. FIG. 9 is an explanatory diagram illustrating the weight coefficients added to the edge candidates, FIG. 9A is an explanatory diagram illustrating an example of the weight coefficients and edge candidates 1 and 2, and FIG. 9B is an example of candidate values in which the weight coefficients are added to edge candidates 1 and 2. As illustrated in FIG. 8, when first region P1 and second region P2 are present in component P, edge candidates 1 and 2 are detected in specific detection line 45. Since detection line 45 may have slightly different sizes due to differences in the lots of components P or differences in a manufacturing company, a predetermined length capable of detecting the position of the outer edge portion even when there is the difference is necessary, and thus, it may be inevitable to cross multiple regions having different brightness. In detection line 45 in FIG. 8, since the brightness difference between first region P1 and second region P2 is larger than the brightness difference between the outside region of the component and first region P1, as illustrated in FIG. 9A, the maximum peak having larger edge candidate 2 than proper edge candidate 1 is obtained. When the edge position is obtained as it is, it is erroneously detected that second region P2 is the position of the outer edge portion of the component, but control device 30 multiplies the maximum peak by the weight coefficient determined so that the reference position obtained from the average of detection lines 45 has the largest value to obtain the candidate value. Therefore, as illustrated in FIG. 9B, control device 30 can select the edge position with edge candidate 1 that is closest to the reference position and appropriate to the reference position as the largest candidate value by applying the weight coefficient. As described above, control device 30 can select a more appropriate edge position by performing more appropriate correction using the weight coefficient while using the derivative value that is not an estimated value or the like and is an actual measurement value.

Then, CPU 31 confirms the position of component P by determining the outer peripheral position of component P using the selected edge position (S370), and terminates the routine. After S370, CPU 31 executes the process after S160.

Here, correspondence relationships between constituent elements of the present embodiment and constituent elements of the present disclosure will be clarified. Control device 30 of the present embodiment corresponds to the information processing device of the present disclosure, and CPU 31 corresponds to the control section. In the present embodiment, an example of an information process method of the present disclosure is also clarified by explaining the operation of control device 30.

Control device 30 of the present embodiment described above sets multiple detection lines 45 for detecting a brightness difference across the region of component P and the outside of the region of component P with respect to the captured image including component P in outer edge portions 41 to 44 of component P, and obtains the reference positions of outer edge portions 41 to 44 from multiple detection lines 45. In addition, control device 30 uses the predetermined weight coefficient of which the weight tends to decrease as the distance from the reference position increases to obtain the candidate value obtained by adding the weight coefficient to one or more edge candidates existing on detection line 45. Then, control device 30 selects the position of the outer edge portion existing on detection line 45 based on the obtained candidate value. In the control device 30, even in a case where edge candidates are present in the outer edge portions of multiple components P, the edge positions of detection lines 45 are selected by adding the weight coefficients based on the reference positions obtained from multiple detection lines 45. Accordingly, even when there are some edge candidates detected to deviate from the proper positions, it is possible to more reliably detect the edge positions of the components.

In addition, since CPU 31 obtains the reference position with respect to the entire outer periphery of component P, it is possible to more reliably detect the edge position of the component by simple process using the reference position that collects the entire outer periphery. In addition, since CPU 31 uses the weight coefficient of the normal distribution with the reference position as the center, the closer to the reference position, the higher the weighting, and the farther away from the reference position, the lower the weighting. In addition, since component P includes first region P1 of the outer edge portion and second region P2 having the brightness value different from that of first region P1, the edge position can be more reliably detected with respect to component P including the regions having multiple brightness value in which the outer edge portion is difficult to detect. In addition, since mounting device 11 includes mounting head 22 for collecting component P and arranging component P on the substrate, and control device 30 having the function as the information processing device described above, the outer edge portion of component P to be mounted can be more reliably detected, and thus, the arrangement or the like of component P can be more reliably performed.

It should be noted that the information processing device disclosed in the present specification is not limited to any of the above embodiments, and may be implemented in various manners as long as it belongs to a technical scope of the present disclosure.

For example, CPU 31 obtains the reference position from the average value of the entire outer periphery of component P in the above embodiment, however, the configuration is not particularly limited to this, and, for example, the reference position for one side may be determined by averaging the edge detection positions of detection lines 45 set for one side of component P. Control device 30 can more reliably detect the outer edge portion of the corresponding component. In addition, CPU 31 may set the reference position of the side by averaging the edge detection positions of detection lines 45 set for the multiple sides of component P. In control device 30, the outer edge portion of component P can be easily and reliably detected using the reference positions collected for the multiple sides with respect to the same side.

Figure 10:
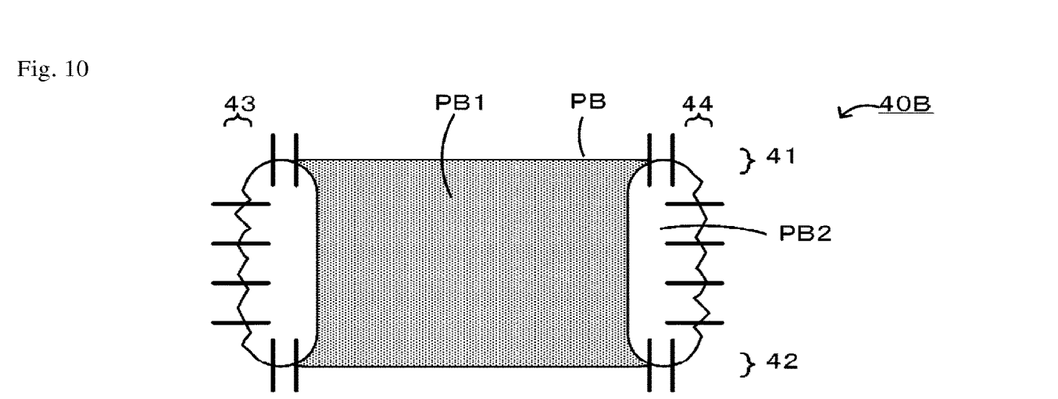
FIG. 10 is an explanatory diagram of component image 40B obtained by imaging another component PB.

In the above embodiment, the case is described in which CPU 31 applies the weight coefficient obtained from one function to one component P, but, the configuration is not particularly limited to this, and CPU 31 may apply the weight coefficient defined by a different function to the multiple sides of component P based on detection stability for one side of component P. FIG. 10 is an explanatory diagram of component image 40B obtained by imaging an image of another component PB. In the component PB, in first region P1 having an upper side and a lower side of an outer periphery of component PB, each side is straight, and thus, the detection stability is high. Meanwhile, since second region PB2 having a right side and a left side of the outer periphery of component PB is not straight and unevenness is irregular, the detection stability is low. For such a component PB, CPU 31 may collectively set the reference positions of the upper and lower sides having high detection stability, and may set the reference positions for each of the left side and the right side. In addition, the weight coefficient may be set using a variable б larger than upper and lower outer edge portions 41 and 42 with respect to outer edge portions 43 and 44 on the left and right sides. In control device 30, the edge position of component P can be more reliably detected by using the weight coefficient set by multiple functions.

Figure 11A:
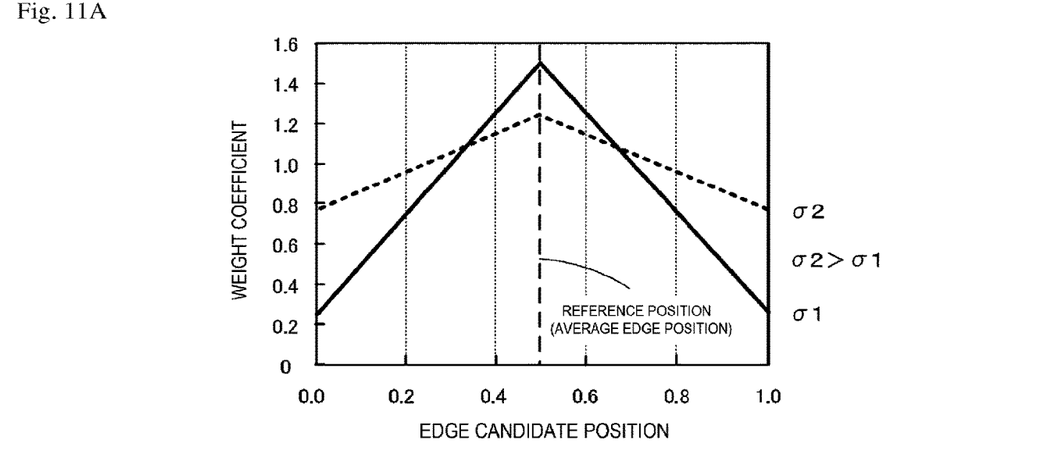
FIG. 11 is a relationship diagram between another edge candidate position and the weight coefficient.
Figure 11B:
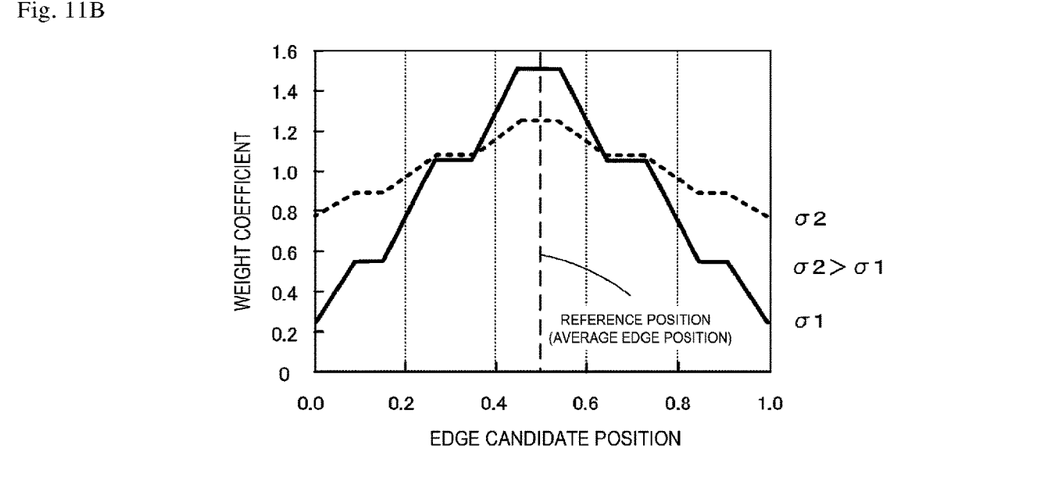

In the above embodiment, CPU 31 uses the weight coefficient defined by the function of the normal distribution centered on the reference position, but the configuration is not particularly limited to this, and CPU 31 may use a weight coefficient defined by a function other than the normal distribution. FIG. 11 is a relationship diagram between another edge candidate position and the weight coefficient, FIG. 11A is an example of a weight coefficient defined by a linear function, and FIG. 11B is an explanatory diagram of an example of a weight coefficient defined such that the weight tends to decrease as the distance from the reference position increases. As illustrated in FIG. 11A, CPU 31 may use, for example, a weight coefficient defined by a function having a linear relationship centered on the reference position. Alternatively, as illustrated in FIG. 11B, CPU 31 may use a weight coefficient set by a function that allows a portion of which the weight is not reduced even when the distance from the reference position increases to partially exist. CPU 31 may appropriately use the weight coefficient set by a t function in accordance with component P to be detected. In the above embodiment, the weight coefficient corresponding to the variable a is obtained using variable a, but the configuration is not particularly limited to this, and the variable б may be a fixed value. In the control device 30, it is possible to further simplify the method of obtaining the weight coefficient. In the above embodiment, a larger weight coefficient is set as being closer to the reference position, and the candidate value having a larger weight coefficient added thereto is selected as the edge position, but the magnitude relationship is not particularly limited to this. For example, a derivative peak may be set on the negative side, a weight coefficient larger on the negative side as it is closer to the reference position may be set, and the candidate value to which the weight coefficient is added may be selected as the edge position having a larger value on the negative side.

In the above embodiment, the position of the outer edge portion of component P having first region P1 and second region P2 having the different brightness from first region P1 is detected, but the configuration is not particularly limited to this, and the position of the outer edge portion of component P having no multiple regions, such as the first region and the second region, may be obtained. In the above embodiment, the position of the outer edge portion of component P having a rectangular outer periphery is obtained, but the configuration is not particularly limited to this, that is, component P having a polygonal outer periphery may be used, or the position of the outer edge portion of a component P having a circular or elliptical outer periphery may be obtained. Even in component P, it is possible to more reliably detect the edge position of component P.

Figure 12:
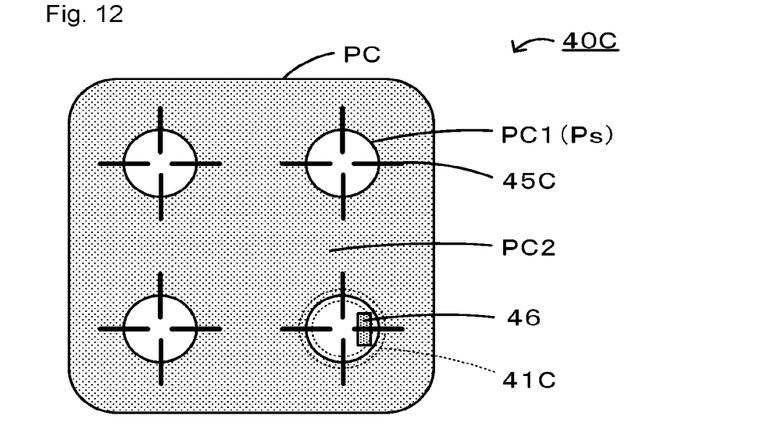
FIG. 12 is an explanatory diagram of component image 40C for detecting an outer edge portion of specific part Ps of component PC.

In the above embodiment, CPU 31 sets detection line 45 across the region of component P and the outside of the region of component P to select the position of the outer edge portion of the component itself, but the configuration is not particularly limited to this. For example, CPU 31 may set detection line 45 across a specific part (for example, terminal or the like) and another part (for example, main body or the like) included in component P to select the position of the outer edge portion of the specific part of component P. FIG. 12 is an explanatory diagram for detecting the outer edge portion of specific part Ps of component P. FIG. 12 is an explanatory diagram of component image 40C for detecting outer edge portion 41C of specific part Ps of component PC. Component PC has multiple specific parts Ps which are bumps. Mounting device 11 accurately detects the position of specific part Ps when performing the mounting process of component PC, aligns the bumps with the terminals on substrate S, and performs the mounting process. In component image 40C, CPU 31 may set detection line 45C across first region PC1 of specific part Ps and second region PC2 of another part (main body) included in component PC to select the position of outer edge portion 41C of specific part Ps. Then, when foreign matter 46 is present on specific part Ps, outer edge portion 41C of specific part Ps may be erroneously detected. As described above, CPU 31 obtains the reference position of outer edge portion 41C of specific part Ps and obtains the candidate value obtained by adding the weight coefficient to select the edge position of specific part Ps. Also in control device 30, the edge position of specific part Ps with respect to component PC can be more reliably detected.

In the above embodiment, the outer edge portion of component P collected by mounting head 22 is detected, but the configuration is not particularly limited to this. For example, the outer edge portion of component P may be detected with respect to the captured image obtained by imaging component P arranged on substrate S by mark camera 24. Even in this case, the position of the outer edge portion of component P can be more accurately obtained.

In the above embodiment, the information processing device and the mounting device according to the present disclosure are described as control device 30 and mounting device 11, but the configuration is not particularly limited to this, and may be an information processing method. In the above embodiment, control device 30 having a function as the information processing device is provided in mounting device 11, but the configuration is not particularly limited as long as it is a mounting-related device related to the processing for mounting component P on substrate S. For example, an inspection device including an inspection section for inspecting the mounting state of component P, a print mounting device including a printing section and a mounting section, and a mounting inspection device including a mounting section and an inspection section may include control device 30.

Here, the information processing device, the mounting device, and the information processing method according to the present disclosure may be configured as follows. For example, in the information processing device according to the present disclosure, the control section may obtain the reference position for one or more among one side of the component, multiple sides of the component, and an entire outer periphery of the component. The component may have different detection stability such as the brightness value and the shape for one side. In the information processing device, when obtaining the reference position for one side of the component, the outer edge portion of the corresponding component can be more reliably detected, the outer edge portion of the component can be easily and reliably detected using the reference position collected for the multiple sides with respect to sides of the same state, or the outer edge portion of the component can be more reliably detected by a simple process using the reference position collecting the entire outer periphery.

In the information processing device according to the present disclosure, the control section may obtain the candidate value using different weight coefficients for one side or multiple sides of the component based on detection stability for each side of the component. In this information processing device, by using multiple weight coefficients, it is possible to more reliably detect the outer edge portion of the component.

In the information processing device according to the present disclosure, the control section may use the weight coefficient of normal distribution centered on the reference position. In this information processing device, using the normal distribution, the closer to the reference position, the higher the weighting, and the farther away from the reference position, the lower the weighting.

In the information processing device according to the present disclosure, the component may include the first region including the outer edge portion and the second region having a different brightness value from that of the first region. In this information processing device, it is possible to more reliably detect the outer edge portion of a component having multiple brightness value regions from which the outer edge portion is difficult to detect.

The mounting device of the present disclosure includes a mounting head configured to collect a component and arrange the component on a substrate, and the information processing device described in any of the above. Since the mounting device includes the above-described information processing device, the outer edge portion of the component to be mounted can be more reliably detected, and thus, the arrangement or the like of the component can be more reliably performed.

According to an aspect of the present disclosure, there is provided an information processing method used in a mounting device configured to collect a component and arrange the component on a substrate, the information processing method including: (a) a step of acquiring a captured image including the component and setting multiple detection lines for detecting a brightness difference of the component with respect to the acquired captured image in the component; (b) a step of obtaining a reference position of outer edge portions from the multiple detection lines set in the step (a) and using a predetermined weight coefficient of which weight tends to decrease as a distance from the reference position increases to obtain a candidate value obtained by adding the weight coefficient to one or more outer edge portion candidates existing on the detection lines; and (c) a step of selecting a position of the outer edge portion existing on the detection line based on the candidate value obtained in the step (b).

Similar to the information processing device described above, in the information processing method, even in a case where the multiple candidates of the component outer edge portions exist, the position of the outer edge portion of the detection line is selected by adding the weight coefficient based on the reference position obtained from the multiple detection lines, and thus, even when there are some candidates detected to deviate from proper positions, it is possible to more reliably detect the outer edge portion of the component. In this information processing method, various aspects of the information processing device described above may be adopted, or steps for achieving the functions of the information processing device described above may be added.

INDUSTRIAL APPLICABILITY

The information processing device and the mounting device according to the present disclosure can be used in the technical field of a device for performing processes such as collecting and arranging components.

REFERENCE SIGNS LIST

10: mounting system, 11: mounting device, 12: substrate process section, 14: component supply section, 16: part camera, 20: mounting section, 21: head moving section, 22: mounting head, 23: suction nozzle, 24: mark camera, 30: control section, 31: CPU, 32: storage section, 35: management PC, 40, 40B, and 40C: component image, 41 to 44 and 41C: outer edge portion, 45 and 45C: detection line, 46: foreign matter, P, PB, and PC: component, P1, PB1, and PC1: first region, P2, PB2, and PC2: second region, Ps specific part, S substrate

The invention claimed is:

1. An information processing device used in a mounting device configured to collect a component and arrange the component on a substrate, the information processing device comprising:
a control section including a processor configured to detect outer edge portions of the component by:
acquiring a captured image including the component,
setting multiple detection lines for detecting a brightness difference of the component with respect to the acquired captured image in the component,
obtaining a reference position of the outer edge portions from the multiple detection lines by normalizing a start point of each detection line to 0 and an end point of each detection line to 1, acquiring a derivative value from the brightness difference of respective positions of the detection lines, detecting a maximum value of the derivative value as an outer edge portion candidate for each of the detection lines, and averaging detection positions of the outer edge portion candidates from the maximum value of the derivative value and a number of detection lines to acquire the reference position of the outer edge portions at a center of the detection lines with a normalized value of 0.5,
using a predetermined weight coefficient of which weight tends to decrease as a distance from the reference position increases to obtain a candidate value obtained by adding the weight coefficient to one or more outer edge portion candidates existing on the detection lines, and selecting a position of the outer edge portion existing on the detection line based on the obtained candidate value having a highest value.

2. The information processing device according to claim 1, wherein the control section obtains the reference position for one or more among one side of the component, multiple sides of the component, and an entire outer periphery of the component.

3. The information processing device according to claim 1, wherein the control section obtains the candidate value using different weight coefficients for one side or multiple sides of the component based on detection stability for each side of the component.

4. The information processing device according to claim 1, wherein the control section uses the weight coefficient of normal distribution centered on the reference position.

5. The information processing device according to claim 1, wherein the component includes a first region including the outer edge portion and a second region having a different brightness value from that of the first region.

6. A mounting device comprising:
a mounting head configured to collect a component and arrange the component on a substrate; and
the information processing device according to claim 1.

7. An information processing method used in a mounting device configured to collect a component and arrange the component on a substrate, the information processing method comprising:

(a) a step of acquiring a captured image including the component and setting multiple detection lines for detecting a brightness difference of the component with respect to the acquired captured image in the component, (b) a step of obtaining a reference position of outer edge portions from the multiple detection lines set in the step of (a) by normalizing a start point of each detection line to 0 and an end point of each detection line to 1, acquiring a derivative value from the brightness difference of respective positions of the detection lines, detecting a maximum value of the derivative value as an outer edge portion candidate for each of the detection lines, and averaging detection positions of the outer edge portion candidates from the maximum value of the derivative value and a number of detection lines to acquire the reference position of the outer edge portions at a center of the detection lines with a normalized value of 0.5, and using a predetermined weight coefficient of which weight tends to decrease as a distance from the reference position increases to obtain a candidate value obtained by adding the weight coefficient to one or more outer edge portion candidates existing on the detection lines; and (c) a step of selecting a position of the outer edge portion existing on the detection line based on the candidate value obtained in the step of (b) having a highest value.

* * * * *